(12) United States Patent
Diab

(10) Patent No.: US 9,647,913 B2
(45) Date of Patent: May 9, 2017

(54) MEASURING AND MANAGING POWER USAGE AND COOLING IN A NETWORK

(75) Inventor: Wael William Diab, San Francisco, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1479 days.

(21) Appl. No.: 12/947,537

(22) Filed: Nov. 16, 2010

(65) Prior Publication Data
US 2012/0124398 A1 May 17, 2012

(51) Int. Cl.
*H04L 12/26* (2006.01)
*H04L 12/24* (2006.01)

(52) U.S. Cl.
CPC ...... *H04L 43/0817* (2013.01); *H04L 41/0833* (2013.01); *H04L 43/065* (2013.01); *H04L 41/22* (2013.01); *Y02B 60/42* (2013.01)

(58) Field of Classification Search
CPC ..... Y02B 60/42; H04L 41/22; H04L 41/0833; H04L 43/065; H04L 43/0817; G05B 15/02; G05B 23/0272; G06F 1/26; G06F 1/32; H05K 7/1492; H05K 7/20836
USPC .............. 709/223; 713/32; 705/8; 726/4
See application file for complete search history.

(56) References Cited

U.S. PATENT DOCUMENTS

| | | | |
|---|---|---|---|
| 2004/0151129 A1* | 8/2004 | Kun-Szabo et al. | 370/254 |
| 2005/0075839 A1* | 4/2005 | Rotheroe | 702/183 |
| 2007/0038414 A1* | 2/2007 | Rasmussen et al. | 703/1 |
| 2009/0204828 A1 | 8/2009 | Diab et al. | |
| 2010/0115306 A1 | 5/2010 | Diab | |
| 2010/0217550 A1* | 8/2010 | Crabtree et al. | 702/62 |
| 2010/0217642 A1 | 8/2010 | Crubtree et al. | |
| 2010/0287258 A1* | 11/2010 | Takeuchi | 709/217 |

FOREIGN PATENT DOCUMENTS

| | | | | |
|---|---|---|---|---|
| CN | 101741721 A | 6/2010 | | |
| SE | WO2010114439 | * | 7/2010 | H04L 12/40 |

OTHER PUBLICATIONS

Maestro and Reviriego (IEEE Transactions on Industrial Electronics, vol. 57, No. 8, Aug. 2010).*
European Search Report for Application No. 11008796.2-2416, dated Jan. 19, 2012, three (3) pages.
Bashar A. et al., "*Employing Bayesian Belief Networks for energy efficient Network Management*," Communication (NCC), 2010 National Conference on, IEEE, Piscataway, NJ, Jan. 29, 2010, pp. 1-5, XP031648153, ISBN: 978-1-4244-6383-1.
Office Action for related Chinese Patent Application No. 2011103610405, mailed Feb. 8, 2014; 8 pages.

* cited by examiner

*Primary Examiner* — Alpus H Hsu
*Assistant Examiner* — Dharmesh Patel
(74) *Attorney, Agent, or Firm* — Sterne, Kessler, Goldstein & Fox P.L.L.C.

(57) ABSTRACT

A system for measuring aspects of a network having a plurality of network components, includes a monitor configured to gather operational characteristics of at least one of the plurality of network components and an analyzer. The analyzer is configured to analyze the gathered operational characteristics received from the monitor and estimate characteristics of an unmonitored one of the plurality of network components based on the gathered operational characteristics.

35 Claims, 11 Drawing Sheets

MEASURING AND MANAGING POWER USAGE AND COOLING IN A NETWORK

FIELD OF THE INVENTION

The present invention generally relates to monitoring and managing power and cooling in a network.

BACKGROUND OF THE INVENTION

Energy costs continue to escalate in a trend that has accelerated in recent years. Because of this, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (e.g., PCs, displays, printers, servers, network components, etc.). Conventional approaches to measuring power usage use intrusive instrumentation to measure each component.

Modern networking components are increasingly implementing energy consumption and efficiency (ECE) control mechanisms. Some ECE control mechanisms allow physical layer components to enter and exit a low power state. An ECE control policy controls when and under what circumstances, ECE control enabled physical layer components enter and exit low power states. Device control policies play a key role in maximizing savings while minimizing performance impact on the network.

Even when networks are implemented using modern ECE mechanisms, there is no non-intrusive approach to measuring and controlling operational characteristics of various linked system devices.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

The invention is described with reference to the accompanying drawings. The drawing in which an element first appears is typically indicated by the leftmost digit(s) in the corresponding reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The following detailed description is exemplary and explanatory and is intended to provide further explanation of the invention as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

Overview

Generally speaking, some embodiments described herein provide an improved approach to the measurement and control of networked components. In contrast to the intrusive measurement approaches noted above, some embodiments described herein monitor a representative sample of network components and then extrapolate the metrics collected to other components in a network.

The monitoring by embodiments includes not only the conventionally measured environmental metrics (temperature, humidity) but also statistics related to modern energy conservation and efficiency (ECE) mechanisms. Using analytical approaches, the same statistics collected and utilized by modern ECE-enabled components, e.g., usage, idle time, data traffic volume, etc., can be used to estimate and predict resource requirements for different connected components in the network. As used herein the terms "extrapolate," "estimate" "derive" and "predict" are used to describe similar operations using collected system characteristics.

By measuring only a smaller sample of data center components, this invention reduces the intrusiveness and expense involved in data center monitoring and control. Once resource requirements are determined, different actions can be triggered to enable different functions.

Conventional Data Center Measurement

Figure 1A:
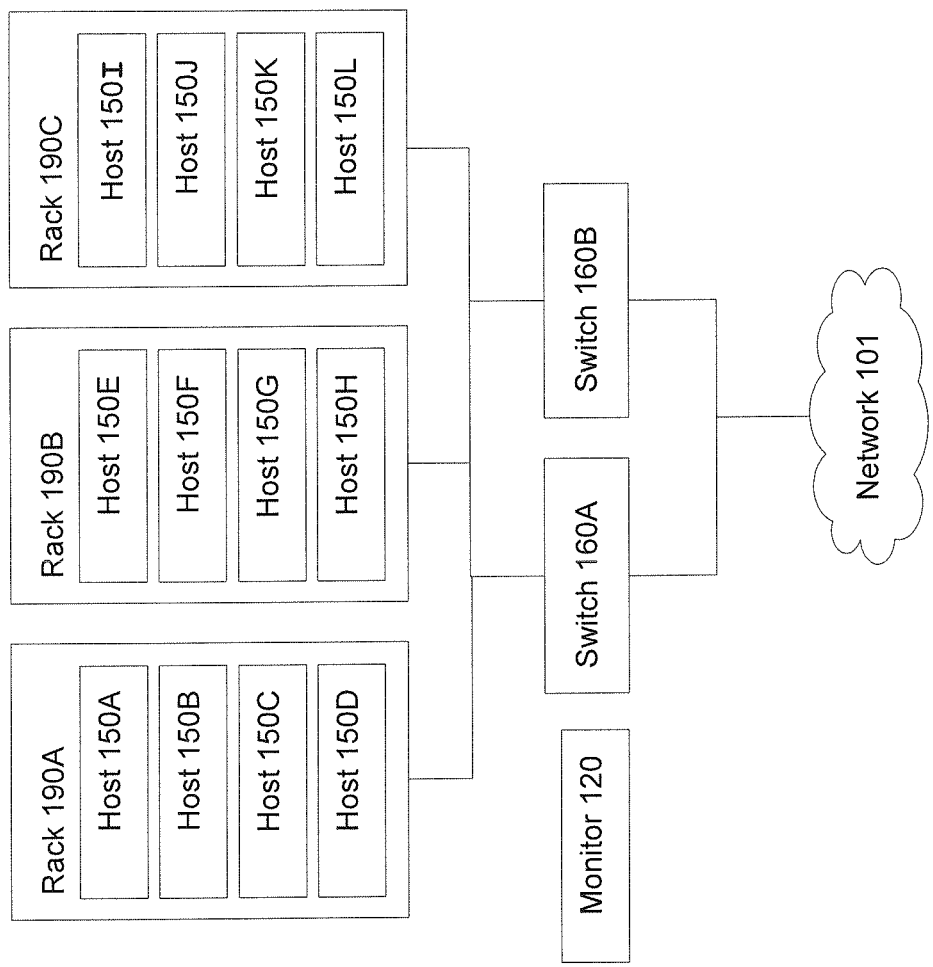
FIG. 1A is a block diagram of a conventional approach to measuring operational characteristics of a network having a plurality of network components.

FIG. 1A is a block diagram of a conventional approach to measuring operational characteristics of a network having a plurality of network components. FIG. 1A shows server racks 190A-C, switches 160A-B, monitor 120 and network 101. Each rack 190A-C contains hosts 150A-D, 150E-H and 150I-L respectively.

As used with some embodiments herein, operational characteristics include environmental characteristics (temperature, humidity) and power usage by components. In conventional system 100, monitor 120 can be a simple temperature sensor temporarily or permanently placed in the data center. As would be appreciated by one having skill in the relevant art(s), conventional measurements of characteristics can have the any combination of the following limiting characteristics M1-M7:

M1. Characteristics measured may simply be environmental characteristics (temperature, humidity), not a full range of characteristics relevant to energy conservation and efficiency.

M2. Measurements may only be temporary, only taken for particular components and/or space for a limited time.

M3. Measurements may be only taken of ambient characteristics (e.g., temperature), not the characteristics of specific components.

M4. When components are measured specifically, a small subset of "critical" components are able to be measured, not a majority.

M5. Notwithstanding the limited collection capabilities of conventional measurement devices, mass deployment of such devices is considered too expensive and/or intrusive and not generally done.

M6. Conventional measurement capabilities do not provide both a global view of a large portion of the data center and specific view of individual devices. As noted in M4, in many cases, only critical devices are measured.

M7. Conventional measurement systems are not configured to receive, analyze and estimate based on modern energy conservation and efficiency information.

As used by some embodiments herein, each host 150A-L can be a computer with various computer system configurations, including multi-core multiprocessor systems, minicomputers, mainframe computers, computers linked or clustered with distributed functions, as well as pervasive or miniature computers that may be embedded into virtually any device. In an embodiment, a host 150A-L of larger capacity and/or performance can be termed a computer server, or just server.

As used by some embodiments herein, racks 190A-C are a standardized frame or enclosure for mounting multiple equipment modules. In an example embodiment, hosts 150A-D are mounted in rack 190A. Use herein of the term "rack" is useful for describing the collection of components in a data center for example, but it should be noted that approaches to some embodiments described herein can be applied to network hardware in any configuration, e.g., stand alone or racked.

As used herein network 101 can be any one or more networks of any type including, but not limited to, local area networks, medium area networks, or wide-area networks, such as, the Internet.

As used by some embodiments described herein, network switch 160A is a networking bridge device with data ports that can additionally have routing/switching capability, e.g., L3 switch/router. The switch could have as little as two data ports or as many as 400 or more data ports, and can direct traffic in full duplex from any port to any other port, effectively making any port act as an input and any port as an output. Herein, data ports and their corresponding links can be interchangeably referred to as data channels, communication links, data links, etc, for ease of discussion.

Because the physical depictions in the figures should not be interpreted as limiting, switch 160A and host 150A, as used herein can include host 150A and switch 160A combined in a single physical device (not shown). In one embodiment, switch 160A also broadly includes the use of switch logic in modern tiered switching architectures. In an embodiment, switch 160A functions can be physically combined with host 150A functions in a single device, e.g., integrating a 2-port v-switch function on a server. Switch 160A can also utilize higher layer functionality, such as access control lists (ACLs) and L4 switching/routing approaches.

Figure 1B:
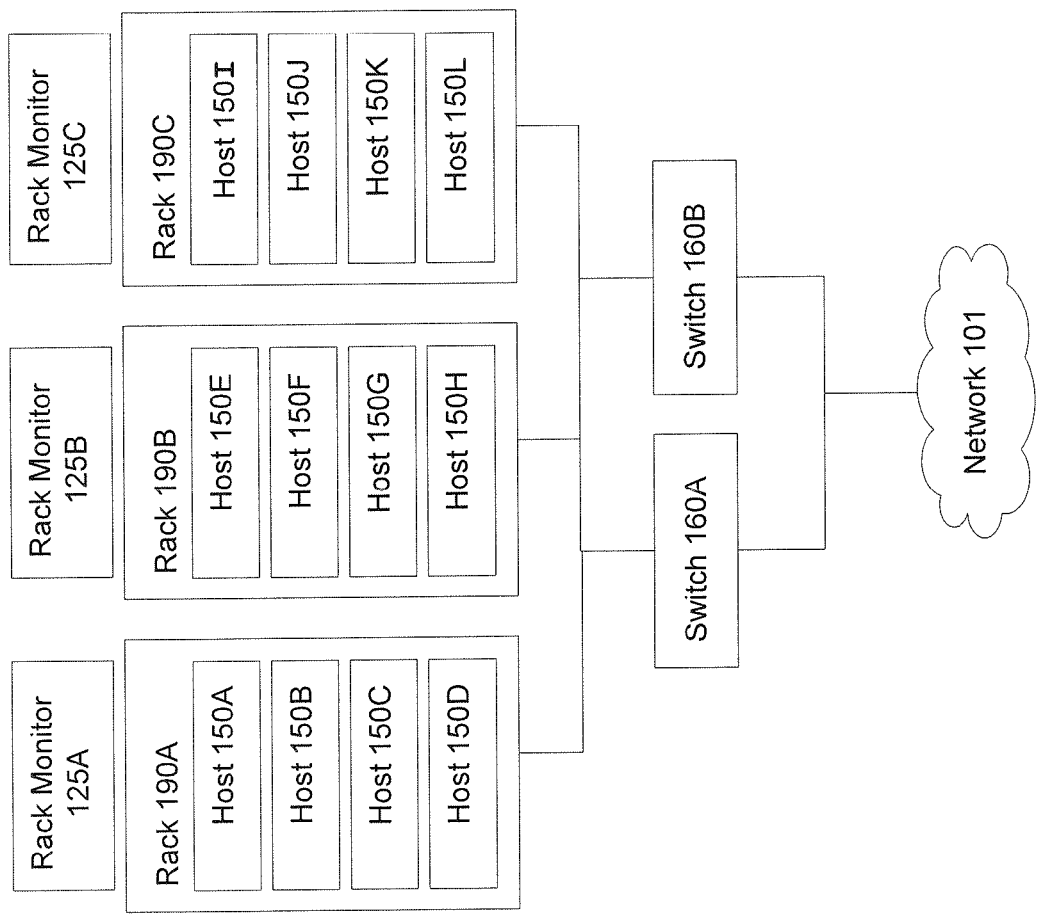
FIG. 1B is a block diagram of another conventional approach to measuring operational characteristics of a network having a plurality of network components.

FIG. 1B is a block diagram of another conventional approach to measuring operational characteristics of a network having a plurality of network components. FIG. 1B depicts a system similar to the FIG. 1A, with an addition of rack monitors 125A-C and without monitor 120.

As used by some implementations of conventional systems 110, rack monitors 125A-C are an example of conventional instruments used to measure characteristics of system 110 operation. System characteristics measured include temperature, humidity and power draw. In an approach (not shown), instrumentation similar to rack monitors 125A-C are installed on hosts 150A-L.

As noted in the background section above, this conventional approach to monitoring—extensive, intrusive monitoring of individual network components—is a high cost approach that doesn't provide a comprehensive view of system 110 resources.

Extrapolated Monitoring

Figure 2:
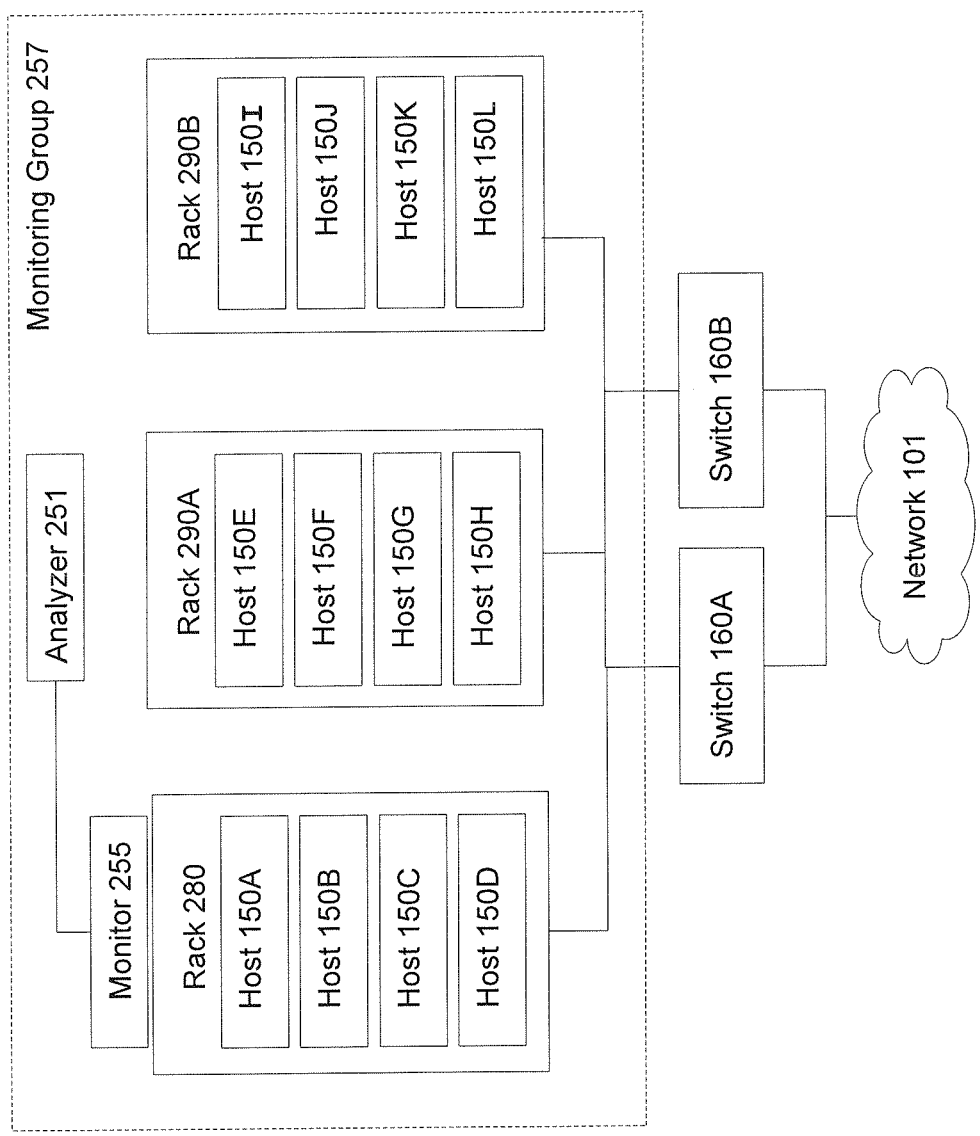
FIG. 2 is a block diagram of an approach to measuring operational characteristics of a network having a plurality of network components, according to an embodiment of the present invention.

FIG. 2 is a block diagram of an approach to monitoring and/or measuring operational characteristics of a network having a plurality of network components, according to an embodiment of the present invention. FIG. 2 depicts a system 210 with rack 280 and racks 290A-B, monitor 255 and analyzer 251 in monitoring group 257. Switches 160A-B are also coupled to network 101. System 210 may be a subset of a larger, interconnected data center having additional hosts similar to hosts 150A-L and additional switches similar to switches 160A-B connected by network 101.

In contrast to the conventional approaches detailed in FIGS. 1A-B, FIG. 2 has monitoring group 257 as having a single rack 280 with measuring instrumentation attached (monitor 255) and two racks 290A-B as not having instrumentation. Monitoring group 257 may be a collection of networking components (some not shown) that is monitored by some embodiments described herein.

Monitor 255 can measure and collect operational characteristics of network components. Analyzer 251 can receive operational characteristics collected by monitor 255 from a subset of network components, and analyze the collected characteristics, and further combine the characteristics with reference information and derive estimated characteristics about related network components. For example, monitor 255 can collect operational characteristics of components associated with rack 280, which are then analyzed by analyzer 251 so that estimated characteristics about racks 290A-B can be derived by the analyzer 251 using reference information (not shown).

Operational Characteristics

To extrapolate the estimated characteristics about related network components, analyzer 251 receives various types of operational characteristics from network components. Examples of operational characteristics include physical layer (PHY) information, link information, application information and energy conservation and efficiency (ECE) information. One having skill in the relevant arts, with access to the teachings herein, will appreciate that a broad range of information, characteristics, policies, etc., will qualify as operational characteristics of network components as used herein.

Physical layer (PHY) information can relate to the operational characteristics or capabilities of a network component itself, including characteristics such as the supported link rates currently available to the network component, the current modes of operation (e.g., subset modes, low power idle (LPI) state) utilized by the component, etc.

Link information can relate to the utilization of the links between network components. Examples of link information include traffic buffer fullness and burstiness parameters (e.g., size of the bursts on the link, time between bursts, idle time on the link, etc.) that enable a determination of the actual link utilization. Another example is the percentage of link capacity usage over time, e.g., if the average usage of 10G link is always less than 1G over a period of time, then this can be a useful measure of link utilization.

Application information can include the applications currently being executed on monitored network components. Application information monitoring can also capture the general types of applications executing on monitored systems. For example, monitored host 150B can be executing a banking application, with heavy continuous processing requirements. Alternatively, host 150B can be executing an e-commerce application with cyclical heavy transactional loads. By considering the applications executing on monitored network components embodiments can improve the accuracy of estimations.

Other types of application information can include the times of day applications are executed, the input/output requirements of the application and other similar information. Application information can also relate to the characteristics of the system applications that govern the operation of network components.

Another example of useful application information includes the application streams running through an analyzed network component. Modern network components can operate on multiple application streams. Application information about the types and performance of the executing streams can be useful in helping to extrapolate characteristics about other network components. For example, in an L2 switch without virtualization, awareness of an Ethernet Audio Video Bridging (AVB) stream running through the component can be combined with other collected information to improve the accuracy of the extrapolation described herein.

As would be appreciated by one having skill in the relevant art(s), given the description herein, various additional types of application information can provide useful operational characteristics when collected and analyzed by embodiments of the invention.

As would be appreciated by one having skill in the relevant art(s), given the description herein, ECE information can include a broad variety of operational characteristics relevant to energy conservation and efficiency (ECE). One type of ECE information used beneficially by some embodiments is information from modern devices that use ECE control mechanisms to improve ECE in networks. Some modern devices collect and store a broad range of statistics about ECE mechanisms and network usage, and some components can make these statistics available in real time to embodiments.

As used herein, energy consumption and efficiency (ECE) control mechanisms are used to refer to various modern techniques for controlling the energy consumption and efficiency of devices. Generally speaking, these ECE mechanisms are designed to reduce energy consumption and improve efficiency while maintaining an acceptable level of performance.

One example of an ECE control mechanism is a mechanism that is configured to use the IEEE Std 802.3az™-2010 standard, also known as Energy Efficient Ethernet (EEE), which is incorporated herein by reference. EEE is an IEEE suggested standard that is designed to save energy in Ethernet networks on a select group of physical layer devices (PHYs).

Example PHYs referred to within the EEE standard include the 100BASE-TX and 1000BASE-T PHYs, as well as emerging 10 GBASE-T technology and backplane interfaces, such as 10 GBASE-KR.

An example ECE control mechanism applied to an EEE enabled switch can monitor and generate statistics about the TX buffer in the switch, and direct the switch to go into a low power idle (LPI) state under certain circumstances. Some embodiments described herein collect and use operational characteristics that comprise generated statistics from LPI enabled devices, such statistics corresponding to when such devices entered and exited the LPI state. As with the percentage of link capacity usage measurement noted above, the percentage of time a device spends in LPI may be a useful operational characteristic.

In a network topology having both devices that have energy conservation and efficiency capabilities and devices that do not have such capabilities, ECE statistics can be collected and extrapolated to the operation of non-ECE enabled devices. For example, in switch 160A some ports may have ECE measures enabled and some may not have such measures enabled.

Additional types of operational characteristics exist that can be beneficially used by some embodiments.

Once the operational characteristics are collected and analyzed by embodiments, estimated characteristics about non-monitored components can be derived and/or generated. For example in system 210, operational characteristics collected by monitor 255 about host 150A in rack 280 can be analyzed and the results extrapolated to unmonitored host 150E in rack 290A.

As discussed below with the description of FIG. 3A, analyzer 251 can be a component in a larger controller device, such device using the estimated characteristics to control network devices. In addition, as discussed with the description of FIG. 4, analyzer 251 can be combined with reference information and log information, such additional information enabling the estimation of additional component characteristics.

Controlling Network Components

Figure 3A:
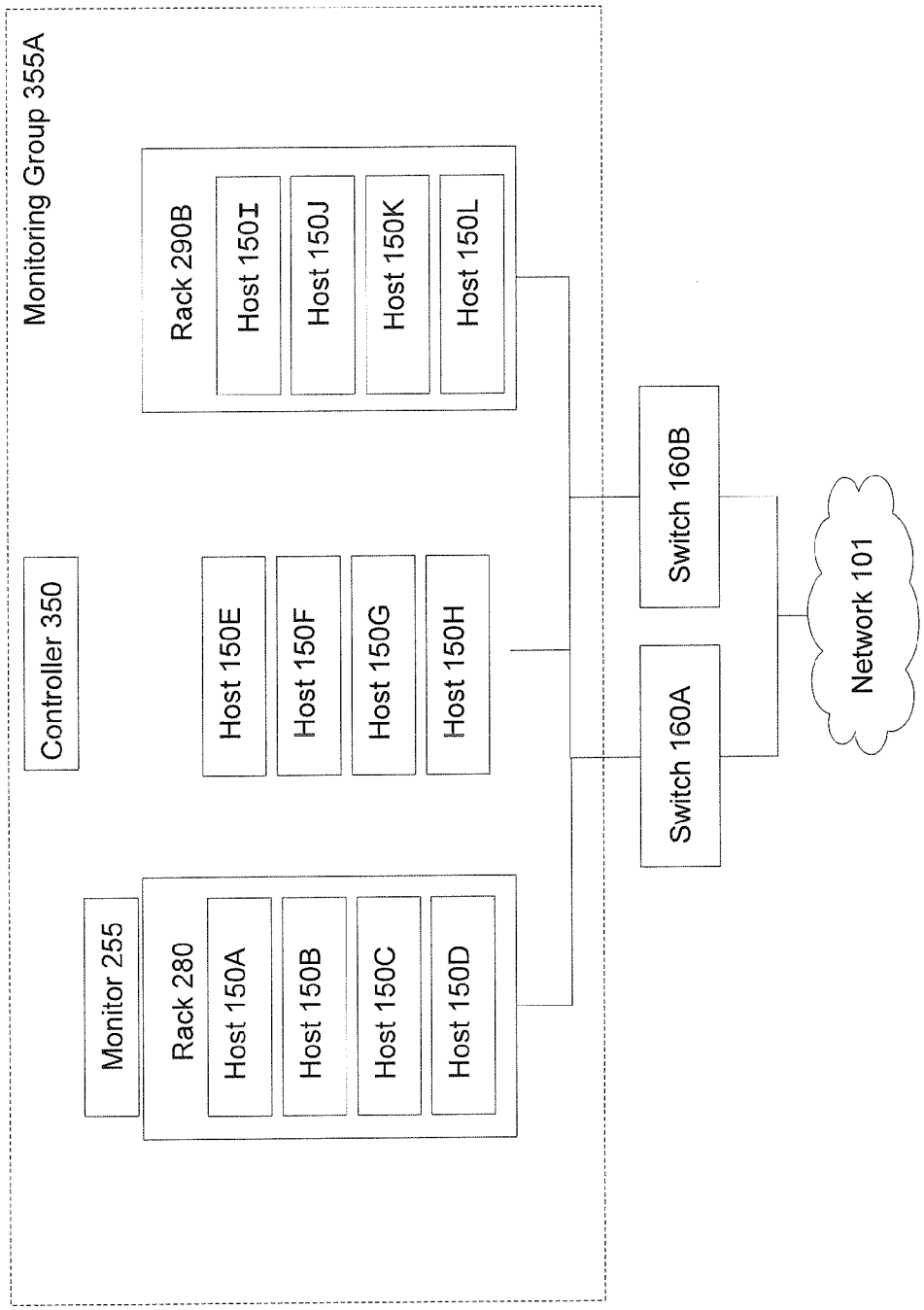
FIG. 3A is a block diagram of an approach to measuring and controlling operational characteristics in a network having a plurality of network components, according to an embodiment of the present invention.

FIG. 3A is a block diagram of an approach to measuring and controlling operational configurations of network components in a network. FIG. 3 depicts a system similar to the system depicted in FIG. 2, with racks 280 and 290A shown having component control managers 310A-B respectively. In the embodiment depicted in FIG. 3A, the functions of analyzer 251 are integrated into controller 350. Below in FIG. 4, an analyzer that is similar to analyzer 251 is depicted as a component into a controller similar to controller 350.

According to an embodiment, controller 350 collects operational information from monitor 255 and generates configuration instructions based on analysis of the collected operational information.

In an embodiment, controller 350 can interact with the hardware of system 310 and coordinate component ECE mechanisms, control policies and other related controls. An embodiment of controller 350 can also balance the requirements of executing applications against other network considerations, e.g., performance, security, etc. In an embodiment, controller 350 actions to improve ECE performance can be balanced, coordinated with, and otherwise modified by, other performance characteristics and goals set for the system generally, and applications specifically.

In an embodiment, controller 350 can follow control policies that are manually generated by a user or an outside, automated process. In another embodiment, controller 350 is guided by control policies that are automatically generated by controller 350 (or another component, not shown) by collecting data about system 310 operation and components. Both the manual and automatic approaches described above can be combined as well. As discussed below with FIGS. 4-8, controller 350 can be guided by, for example, power budgets, thresholds, power usage restrictions and application requirements.

In an embodiment controller 350 can use ECE policy parameters to change the configuration of network components. ECE policy parameters can relate to those parameters that can govern the analysis and/or operation of the control policy set for a network component. When a network component is configured, for example, policy parameters can be set to govern the ECE operation of the device, including link utilization thresholds, IT policies, user parameters, etc.

As should be appreciated, the specific set of operational characteristics received, the analysis performed on the operational characteristics and the process of generating configuration instructions based on analysis of the operational characteristics would be implementation dependent. Regardless of the data collected and the analysis mechanisms used, it is significant that controller 350 is consolidating, analyzing and utilizing power information from network components to guide the configuration of specific components. In an embodiment, controller 350 can use collected operational characteristics to generally control aspects of link configuration and routing/switching.

Figure 3B:
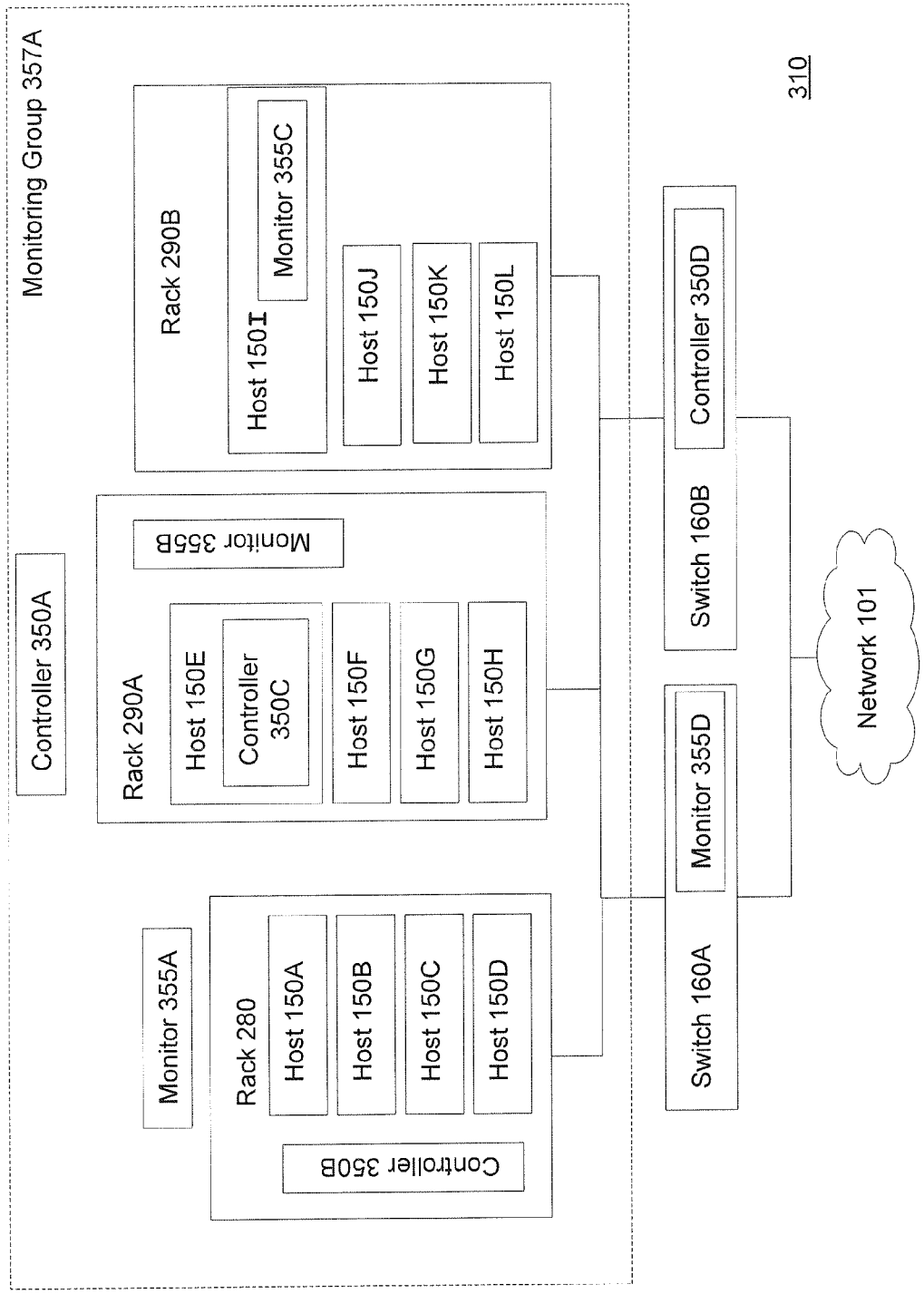
FIG. 3B is a block diagram showing different embodiments of a global control policy manager.

FIG. 3B illustrates system 310 with alternative physical and logical configurations for different embodiments of monitor 255 and controller 350 from FIGS. 2-3A. Each depicted placement of monitors 355A-D and controller 350A-D is intended to be non-limiting, and present a placement that can function independently or in coordination with other respective monitor 355A-D and controller 350A-D components. For example, system 310 could have a single monitor 355A, two monitors 355A-B, or all four monitors 355A-D components. Similar combinations of controller 350A-D can be used by embodiments.

In embodiments, monitor 355A and controller 350A are depicted in FIG. 3B as a part of monitoring group 357A and external to all depicted components. In another depicted embodiment, monitor 355B and controller 350B are depicted in FIG. 3B as a part of racks 280 and 290A, respectively. In another embodiment, monitor 355C and controller 350C are depicted in FIG. 3B as a part of hosts 150E and 150I, respectively. In a last embodiment, monitor 355D and controller 350D are depicted as placed in switches 160A and 160B, respectively. It is important to note that the monitor/controller pairs noted above need not be placed together in embodiments. Any combination of monitor/controller may be used in different embodiments.

The placement illustrations of FIG. 3B are not intended to be limiting. One having skill in the relevant art will appreciate that the functions of monitors 355A-D and controllers 350A-D as described herein can be located in various positions within the systems described herein, implemented as either software or hardware, or a combination of the two.

Analysis of Operational Characteristics

Figure 4:
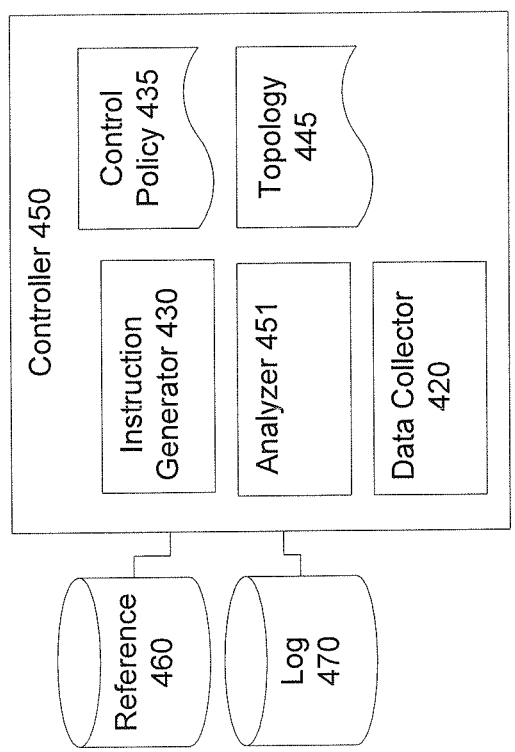
FIG. 4 is a block diagram depicting a detailed view of a controller configured to measure, analyze, extrapolate and control operational characteristics of a network, according to an embodiment of the present invention.

FIG. 4 is a block diagram depicting a detailed view of a controller configured to measure, analyze, extrapolate and control operational characteristics of a network, according to an embodiment of the present invention. Controller 450 is depicted as having analyzer 451, data collector 420, control policy 435 and topology 445. Reference 460 and log 470 are depicted as coupled to controller 450. As noted above, analyzer 451 has similar functions to analyzer 251 from FIG. 2.

As discussed with FIG. 2, in some embodiments, analyzer 251 performs analysis upon collected operational characteristics of monitored network components. Analyzer 451 performs additional analysis, such analysis being informed by additional information, e.g., other relevant pieces of information, available for retrieval.

In an example of the operation of controller 450 described above, data collector 420 collects the operational characteristics from monitor 255 (not shown) and analyzer 451 analyzes the information. In an embodiment, analyzer 451 combines additional relevant information provided by reference 460, log 470, control policy 435 and topology 445 with the collected operational characteristics.

As would be appreciated by one having skill in the relevant art(s), given the description herein, various types of information can be stored and beneficially combined with collected operational characteristics by analyzer 451. The list of types T1-T4 below is intended to be a non-limiting exemplary list of different types of relevant data, with illustrative discussion.

T1. Log Data: In an embodiment, log 470 can be used to store collected operational characteristics for later retrieval. For example, different characteristics (e.g., power usage, temperature, application execution) collected over time can be stored in log 470 for retrieval. A determined pattern, for example, that power usage increases at a particular time each day, can be combined by analyzer 451 with other characteristics, applications executing at that time for example.

T2. Topology Data: In an embodiment, topology 445 stores the characteristics of the relevant network—hosts, switches, links—and can provide a framework for the application of data collected from monitored components to the operation of unmonitored components.

T3. Reference Data: In an embodiment, reference 460 can provide a reference having physical characteristics of identified network components. For example, modern servers have detailed power ratings, recommended temperature and humidity zones and other general physical characteristics, such characteristics being beneficially combined with other information by analyzer 451 and/or instruction generator 430.

T4. Control Policy Information: As typically used herein, a control policy is broadly used to describe a guiding policy that can control a network component, e.g., an ECE control policy. For example, a control policy for a switch can describe when, and under what circumstances the switch enters and exits an energy-saving low power state. A control policy may be used by controller 450 to control one or more physical or virtual devices in a system. Control policies (also termed physical control policies or device control policies) add an additional layer of control to EEE capable devices.

For example, control policy 435 can store control policies for all connected network components. Also, as a component in the network, controller 450 can also have a separate control policy that guides its energy savings functions.

It should be noted that the principles of the present invention can be broadly applied to various contexts similar to the contexts discussed herein, such as in all PHYs that implement ECE (e.g., backplane, twisted pair, optical, etc.). Moreover, the principles of the present invention can be applied to standard or non-standard (e.g., 2.5G, 5G, 100M, 1G and 10G optical interfaces, PON, etc.) link rates, as well as future link rates (e.g., 40G, 100G, 400G, Terabit etc.). It should also be noted that the principles of the present invention can be applied to a given link either asymmetrically or symmetrically. The teachings herein are not intended to be limited to particular media type. In addition to those mentioned herein, other media types, both existing and non-existing, can also use the approaches herein, e.g., structured cabling, optical cabling, etc.

As should be appreciated, the specific set of operational characteristics received, the analysis performed on the operational characteristics, and the process of controlling network components based on the operational characteristics, would be implementation dependent. Regardless of the data collected and the analysis mechanisms used, it is significant that controller 450 is using collected information about components to guide the coordinated control of network components.

Monitoring Groups

Figure 5:
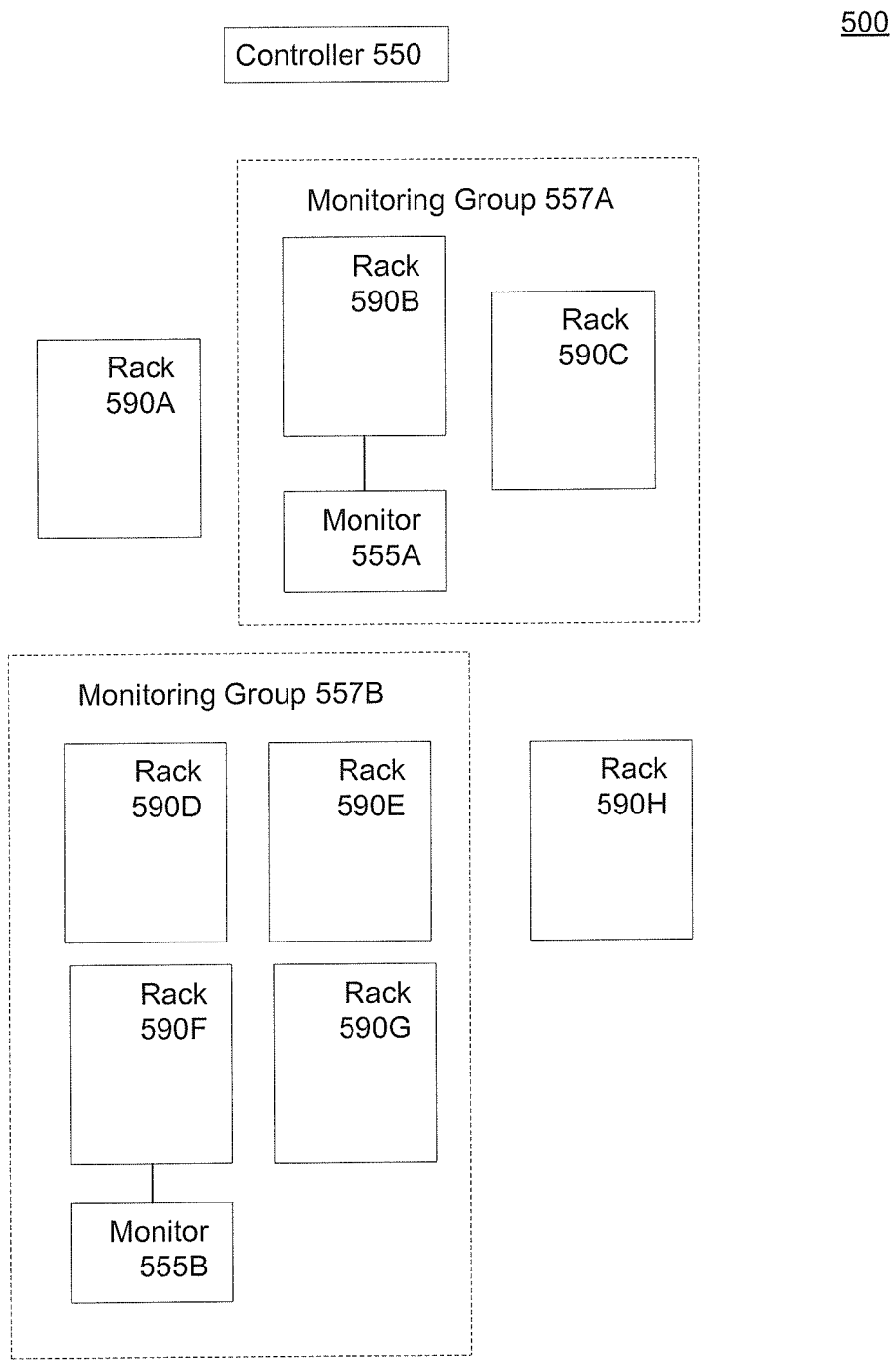
FIG. 5 is a block diagram depicting multiple monitoring groups in a network, according to an embodiment of the present invention.

FIG. 5 is a block diagram depicting multiple monitoring groups in a network, according to an embodiment of the present invention. Monitoring groups 557A-B have racks 590B-C and racks 590D-G respectively. Rack 590B in monitoring group 557A and rack 590F in monitoring group 557B are depicted as having monitors 555A-B respectively coupled thereto. Rack 590A is depicted as not part of a monitoring group.

In an embodiment, each monitoring group can correspond to a particular customer of data center services. For example, monitoring groups 557A and 557B can correspond to a first customer and a second customer respectively, using data center resources to run applications and monitoring.

Some embodiments described herein use measured operational characteristics combined with additional relevant information (examples T1 T4 above) to determine estimated characteristics about each monitoring group 557A-B.

In the example shown in FIG. 5, monitor 555A, by monitoring the components of rack 590B, can provide controller 550 with useful information to determine estimated characteristics of monitoring group 557A. The following list C1-C7 is intended to be a non-limiting further example of collected operational characteristics and relevant additional data that can be used by controller 550 to determine an aggregate characteristic of monitoring group 557A. This example can be applied generally to other embodiments described herein as well.

In this example, the aggregate characteristic is the real-time power draw of all of the components of the group. It is important to note that rack 590B is used as an example collection of components for convenience; other collections of components of system 500 could be used without departing from the spirit of invention described herein. Examples of collected characteristics C1-C7 illustrate the operation of embodiments as follows:

C1. The power draw of the components of rack 590B. As would be appreciated by one having skill in the relevant art(s) given the description herein, the components of rack 590B can include hosts, switches, routers and other network components. It should be appreciated that monitor 555A can be applied to different combinations of measured components. For example, monitor 555A could be applied to a single host component of rack 590B (not shown) any combination of available components, e.g., all of the hosts of rack 590B, or a subset.

C2. The operating temperature of a single host component of rack 590B (not shown), or any combination of available components, or all of the hosts of rack 590B. Monitor 555A, when measuring temperature, can be applied to different physical areas surrounding rack 590B.

C3. The humidity of different physical areas surrounding rack 590B.

C4. The applications currently being executed by one or more hosts operating on rack 590B.

C5. The characteristics of the links associated with rack 590B, including the utilization of the links between rack 590B and other network components, traffic buffer fullness, the size of the bursts on the link, time between bursts, idle time on the link, etc. As with any of the measured operational characteristics discussed herein, the percentage of link capacity usage can be collected and analyzed over time.

C6. The state of ECE control mechanisms can be collected by monitor 555A. For example, whether ingress or egress links have been idled or subrated can be collected, as well as whether components of rack 590B have been placed in an energy saving low power mode.

C7. The ECE control policies that are currently controlling components of rack 590B. In some embodiments, control policies are analyzed at least because of their predictive value relevant to controlled components, e.g., control policies describe the times, triggering events, and results of particular actions.

As would be appreciated by one having skill in the relevant art(s), given the description herein, similar operating characteristics can be collected and used by embodiments to beneficially measure and control components of monitoring groups 557A-B.

Global Control Policy Manager

Figure 6:
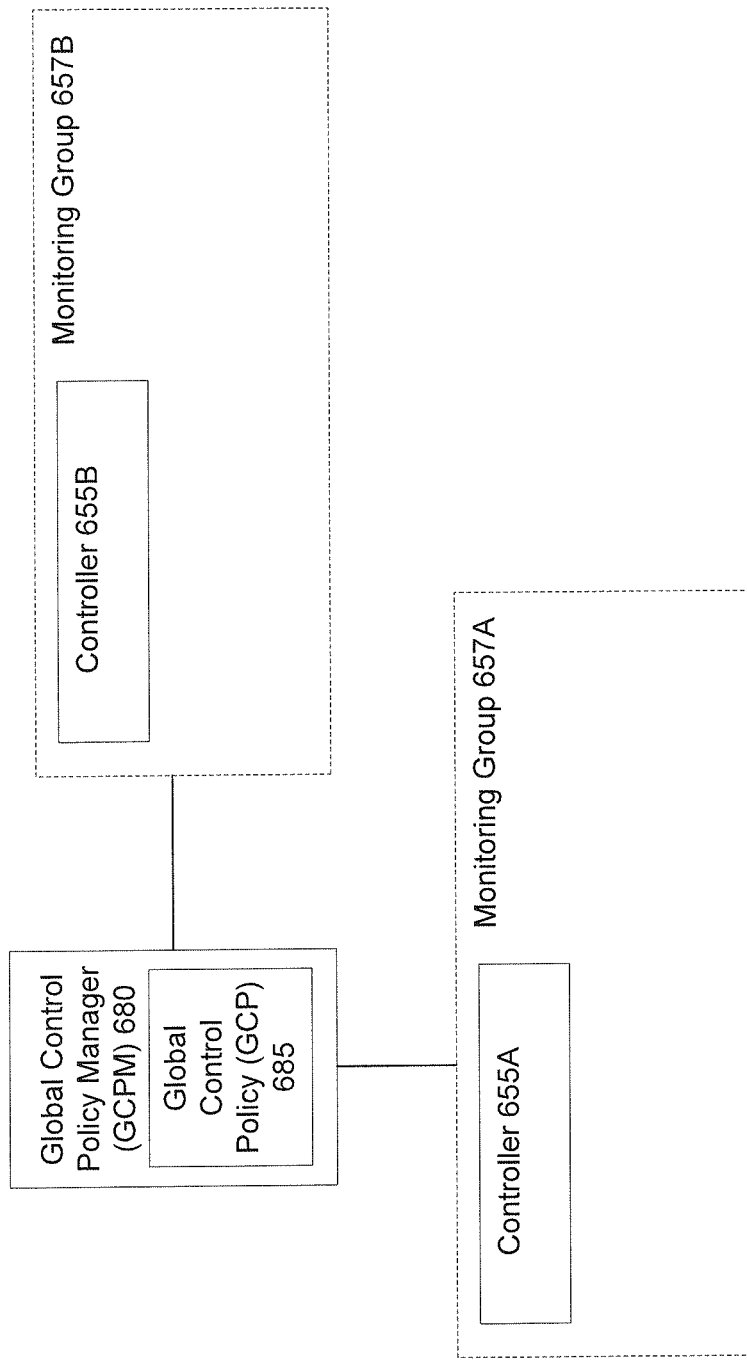
FIG. 6 is a block diagram depicting multiple monitoring groups and a global control policy manager (GCPM) in a network, according to an embodiment of the present invention.

FIG. 6 is a block diagram depicting multiple monitoring groups and a global control policy manager (GCPM) in a network, according to an embodiment of the present invention. GCPM 680 is depicted as having global control policy 685, and as being coupled to monitoring groups 657A-B. Monitoring groups 657A-B are depicted as having controllers 655A-B respectively.

As used herein an embodiment of global control policy (GCP) 685 is a configuration policy that sets out a high level objective for individual device control policies, so as to promote different results associated with implemented network jobs. In another embodiment, GCP 685 can have settings that are directed to promoting results associated with different components, hosts generally and a combination of virtualized jobs. One having skill in the relevant art with access to the teachings herein will appreciate that the global system control policy outlined in GCP 685 can have different levels of detail and be applied to different types of related considerations.

According to an embodiment, GCPM 680 can interact with the hardware of system 600 and use GCP 685 to coordinate their ECE mechanisms, control policies and other related controls, with the requirements of implemented network jobs. An embodiment of GCP 685 can also balance the requirements of implemented network jobs against other network considerations, e.g., performance, security, etc. In an embodiment, GCPM 680 actions to improve ECE performance can be balanced, coordinated with, and otherwise modified by, other performance characteristics and goals set for the system generally, and other virtualized jobs specifically.

An example of a Global Control Policy Manager (GCPM) 680 can be found in U.S. patent application Ser. No. 12/813,085, which is entitled "Global Control Policy Manager," filed Jun. 10, 2010 and is incorporated herein by reference in its entirety ("GCPM Application").

In an embodiment, GCP 685 can be manually generated by a user or an outside, automated process. In another embodiment, GCP 685 is automatically generated by GCPM 680 by collecting data about implemented network jobs and system 600 components, and automatically selects an advantageous global policy. Both the manual and automatic approaches described above can be combined as well.

In implementing GCP 685, GCPM 680 can receive various types of ECE/power-relevant information (power information) about network components. GCPM 680, in embodiments, can also direct configuration changes to affect the components from which this power information is received. Examples of this power information include physical layer (PHY) information, link information, ECE control policy information and application information. One having skill in the relevant arts, with access to the teachings herein, will appreciate that a broad range of information, characteristics, policies, etc., will qualify as power information as used herein.

In an embodiment, controllers 250, 450 can exchange information with GCPM 680, and GCPM 680 can integrate the data collection and analysis of embodiments into the various control policy functions with which it is tasked. For example, GCPM 680 can monitor power, link and application information using different embodiments of monitor 255. Conversely, controllers 350, 450 can analyze collected operational characteristics using determined power thresholds and/or budgets relayed by GCPM 680 according to GCP 685.

In another embodiment, the control policies implemented by GCPM 680 may affect the operation of different embodiments. For example, based on a control policy, different alarm thresholds may be used with described measurement systems. Also, limitations of use may be placed on measured components according to a control policy and measurements/estimations generated by embodiments described herein. As would be appreciated by one having skill in the relevant art(s), and having familiarity with the present disclosure and the GCPM application, aspects of embodiments described herein can interact with embodiments of the GCPM application in additional beneficial ways.

Oversubscription

Figure 7:
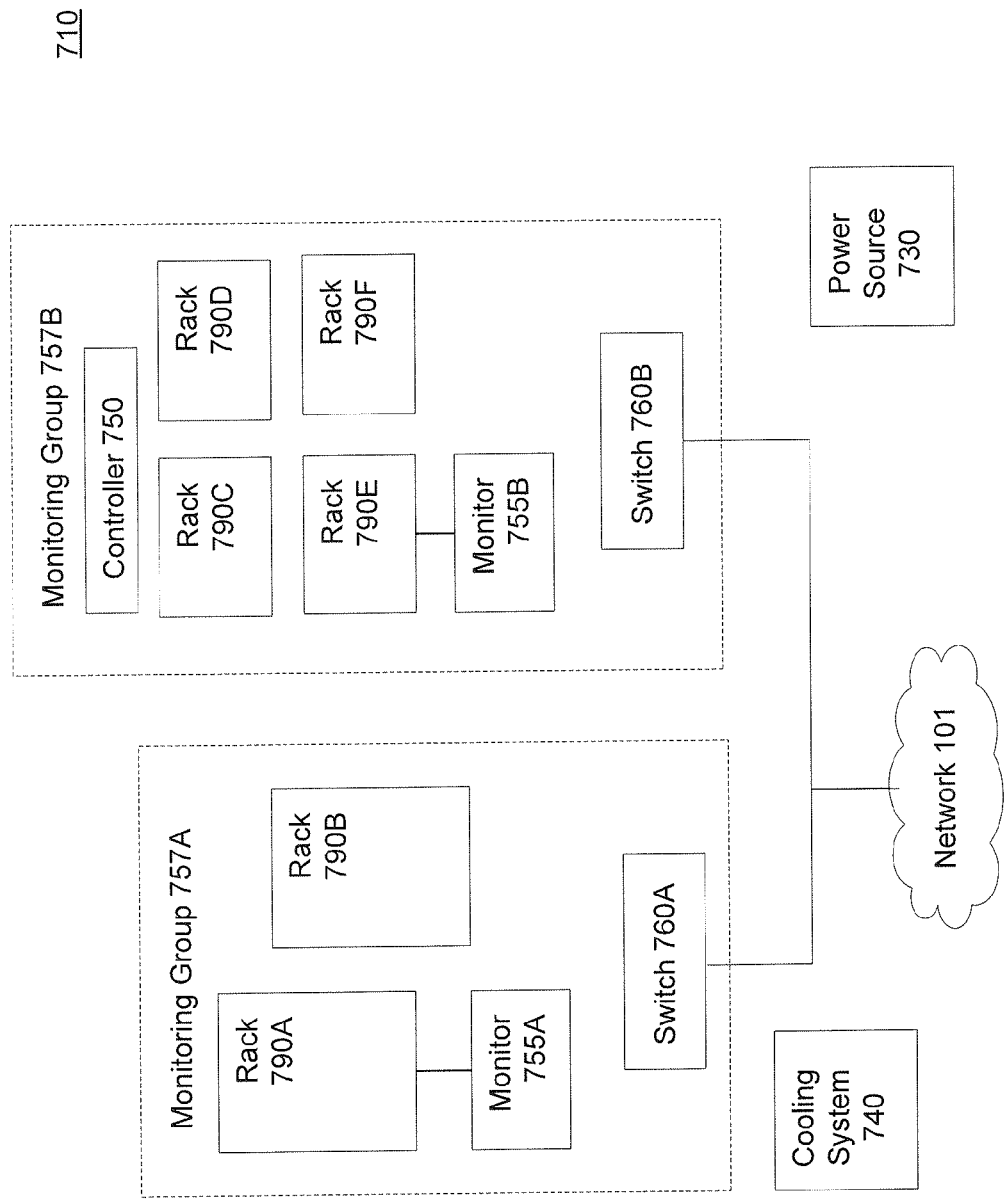
FIG. 7 is a block diagram depicting multiple monitoring groups in a network having an oversubscribed power configuration, according to an embodiment of the present invention.

FIG. 7 depicts system 710 with multiple monitoring groups in a network, according to an embodiment of the present invention. Monitoring groups 757A-B are depicted as having racks 790A-B and racks 790A-B and 790C-F respectively. Rack 790A in monitoring group 757A and rack 790E in monitoring group 757B are depicted as having monitors 755A-B respectively coupled thereto.

Many data centers have excess capacity for powering center components. Some conventional approaches to measuring power usage in a data center utilize a centralized measurement of the total power requirements of the data center. This aggregate measurement does not include specific information about individual data center components.

The measurement, analysis and control approaches outlined with FIGS. 2-6 above provide a detailed, real-time view of system components. By using the detailed information provided by embodiments, the circuits serving the data center can be oversubscribed such that more data center components can be served by a circuit than was originally designed. By monitoring energy policy control statistics for individual components in the data center, the oversubscription can be monitored and reduced if requirements increase.

Returning to FIG. 7, in an example, each rack 790A-F, holds 10 host components (not shown), each host having a maximum power draw of 300 watts. Thus the total power draw of racks 790A-F is 18 kilowatts (6 racks*10 hosts/rack*300 watts per host).

As would be appreciated by one having skill in the relevant art(s), maximum cooling wattage is estimated to be 20% of the maximum system 710 draw. Thus cooling system 740 can supply cooling that uses 3.6 kilowatts (20% of 18 kilowatts). Thus, in this example, the total estimated maximum power draw for system 710 is 21.6 kilowatts. For convenience, this example does not consider other power requirements In an example, system 710 has been designed with power source 730 that can provide 16.2 kilowatts—20% less wattage than the total estimated power draw (21.6 kilowatts−20%=16.2 kilowatts). This approach, by embodiments, to connecting devices with a potential to draw more power than can be provided by power source 730 is termed "oversubscription." In this example, system 710 regularly operates at 40% of maximum its power draw.

By approaches described herein, controller 750 and monitors 755A-B provide comprehensive, accurate, real-time monitoring of system 710. This detailed monitoring enables system 710 to be maintained with the above-described level of oversubscription.

To enable oversubscription, some embodiments gather operational characteristics as described with FIGS. 2-7 above and manage ECE control policies to gracefully degrade data center resources for applications determined to exceed power budgets within system 710.

For example, a data center customer may have underestimated the energy requirements of installed applications on resources they utilize. In this example, an embodiment can use the measurement techniques described with the description of FIG. 2 above to determine which resources have exceeded a power budget. The real-time collection of operational characteristics, in combination with relevant information and analysis allows some embodiments to respond to excessive power requirements. Other embodiments can log information and present analysis for consideration at a later time.

Once a power budget is determined to have been exceeded, the control features described with the description of FIG. 3 above can allow some embodiments to use various mechanisms to reduce the power draw of the excessive components. Because of the granular nature of ECE control policies and/or mechanisms across the data center, this degradation of performance may be selectively applied to those components utilized by applications determined to have excessive power usage. For example, degradation can be implemented by increasing the latency of resources that are being used by the offending application, or completing idling the subject resources, and/or taking other measures to otherwise step-down performance to reduce power consumption. Excessive applications can include applications that are exceeding link usage or other network resources, in addition to excessive power usage.

In an embodiment, the reduction in usage of particular resources can be done gradually, allowing system administrators to take alternate steps, reallocate resources, or purchase additional data center resources. In an embodiment, because of the targeted, gradual reduction in functions to specific applications, the responsive actions are termed "gradual degradation" of excessive data center applications.

With the example described above in FIG. 7, when system usage approaches a pre-determined threshold (e.g., 75%) of maximum draw, different options can be used by embodiments. One option is to use ECE control mechanisms to reduce the power draw of network components as required.

As would be appreciated by one having skill in the relevant art(s), given the description herein, ECE control mechanisms can be implemented by ECE control policies, where such policies are often designed to balance competing performance and power needs. For example, to reduce the power draw of the components in monitoring group 757B, an aggressive control policy can be implemented on switch 760B that is designed to lengthen idle times within the switch when power draw exceeds a predetermined threshold.

Referring to the example discussed with the description of FIG. 5 above, in a situation where the first customer (with applications in monitoring group 757A) goes over a threshold of power draw, an embodiment can reduce the power draw of the customer in various ways. List D1-DX is intended to be a non-limiting list of different approaches to reducing resource usage used by some embodiments:

D1. Link speeds and data rates can be incrementally slowed, thereby reducing the processing by racks 790A-B. For example, ECE control mechanisms in switch 760A can be used to subrate the connection speeds of monitoring group 757A.

D2. Functions can be selectively disabled for resources in monitoring group 757A. In should be appreciated that some PHY resources with modern ECE control mechanisms can be idled for power savings. Embodiments described herein use this idle function to limit or control resource usage for specific portions of system 710.

D3. Ports having ECE control mechanisms enabled can be selectively disabled or limited. Examples of this in FIG. 7 include the ports of hosts in racks 790A-B, and the ports of switch 760A.

One having skill in the relevant art(s), given the descriptions here will appreciate that many different ways exist for embodiments to reduce the resource usage of specific collections of resources in monitoring group 757A.

As should be appreciated, the specific approach to the "graceful" degradation of resources is implementation dependent. Regardless of the data collected or the mechanisms used to implement the degradation process, it is advantageous that the controller 750 is using a systematic approach to allocating limited resources in a network. Further, in one embodiment, the controller 750 advantageously uses ECE control mechanisms to implement the resource degradation process.

Cooling

Figure 8:
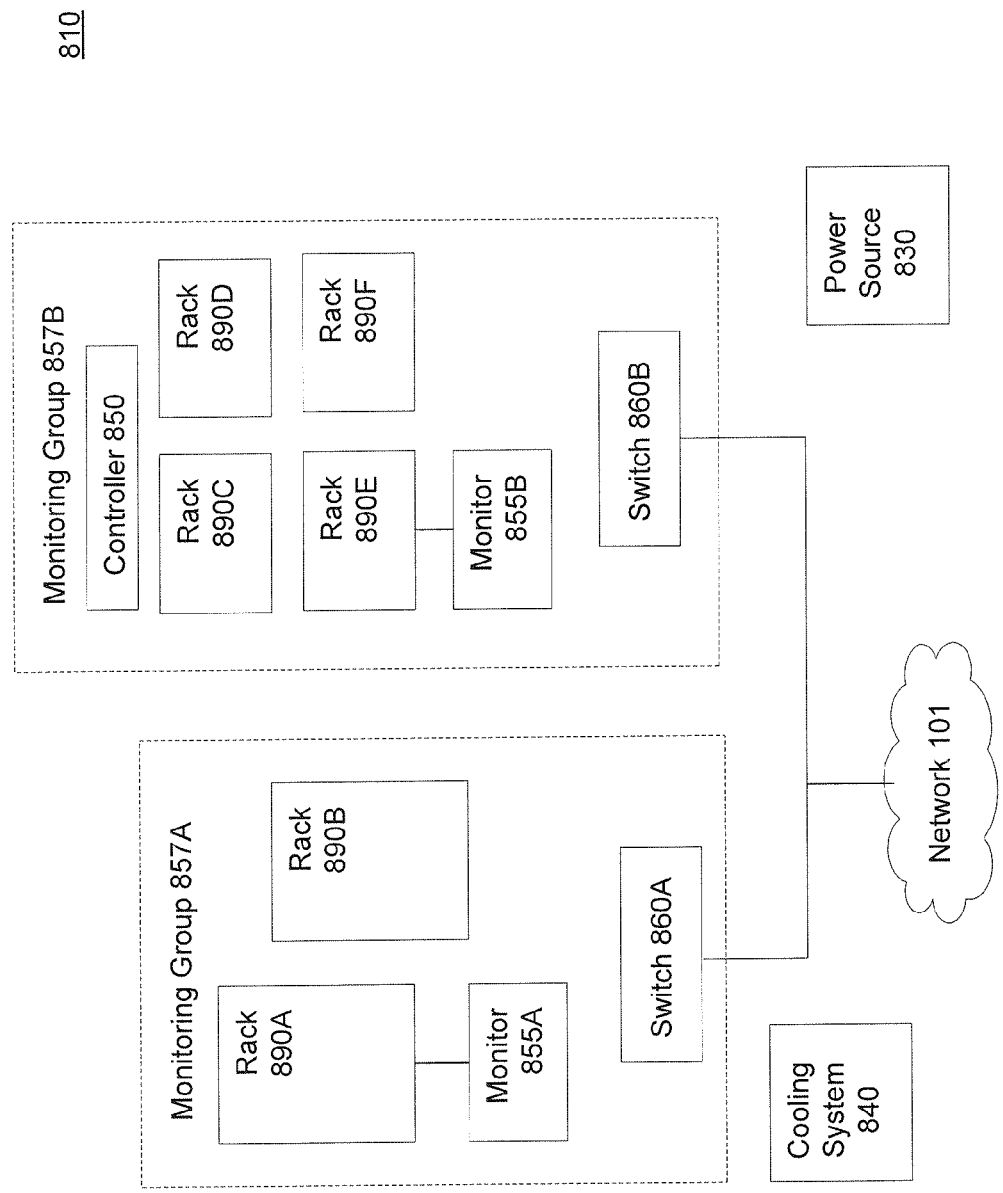
FIG. 8 is a block diagram depicting multiple monitoring groups in a network having a monitored cooling system, according to an embodiment of the present invention.

FIG. 8 depicts system 810 with a cooling system and multiple monitoring groups in a network, according to an embodiment of the present invention. Monitoring groups 857A-B are depicted as having racks 890A-B and racks 890C-F respectively, with monitoring group 857B having controller 850. Rack 890A in monitoring group 857A, and rack 890E in monitoring group 857B, are depicted as having monitors 855A-B respectively coupled thereto. Also, cooling system 840, power source 830 and switches 860A-B coupled to network 101, are shown in FIG. 8.

In some data center implementations, cooling system 840 can consume the most power of all the data center components. Traditional approaches to monitoring data center cooling requirements can involve the expensive and intrusive installation of temperature measuring equipment for each data center component, e.g., heat sensors for each server rack as depicted in FIG. 1B. Using the monitoring approaches discussed with FIGS. 2-7 above, some embodiments of controller 850 can receive operational characteristics, combine the characteristics with reference information and extrapolate the measurements to other, non-instrumented components in the system 810. For this example, at least one of the operational characteristics collected by monitors 855A-B relate to environmental factors, such as heat and humidity.

In this example, operational characteristics monitored by some embodiments include not only environmental metrics, but also ECE statistics related to an energy control policy implementation, and network operational characteristics such as data traffic metrics, as described above in FIGS. 2-7.

Using the analytical approaches discussed with FIGS. 2-7, the same statistics collected and utilized for energy control policies, e.g., usage, idle time, data traffic volume, etc., can be used to estimate and predict cooling requirements for different components within the data center, where the collected ECE statistics are a proxy for where heat is being generated in system 810. By measuring only a small sample of data center components, the system shown in FIG. 8 can reduce the intrusiveness and expense involved in monitoring data center temperature and the determination of data center "hot spots."

An embodiment of the cooling approach shown in FIG. 8 and described herein can also facilitate the oversubscription approach discussed with the description of FIG. 7. Sometimes a resource can have two constraints in terms of power requirements. As addressed above, a component can have a constraint in the amount of power it can draw. Further, a resource can also have limits on how much it can be cooled.

Frequently, sufficient cooling of a network resource, along with the power requirements of the cooling components, becomes a limiting factor—not the power draw of the resource itself. System 810, by providing improved monitoring of data center components, can enable the oversubscription of cooling resources as well as the power resources noted above with the description of FIG. 7.

By approaches described herein, controller 850 and monitors 855A-B provide comprehensive, accurate, real-time monitoring of system 810. Similar to the estimation of power usage described above, the detailed monitoring provided by embodiments enables the cooling requirements of system 810 to be determined.

If an embodiment determines that the cooling resources applied to system 810 exceed the determined cooling requirements of system 810, a reduction in applied cooling resources can be implemented by controller 850. As would be appreciated by one having skill in the relevant art(s), given the description herein, this reduced cooling configuration can further the overall goal of improving ECE for system 810 generally.

In designing system 810, the monitoring approaches described herein also enable the oversubscription of the cooling resources, without being constrained by the potential cooling requirements of the incorporated components.

Method 900

Figure 9:
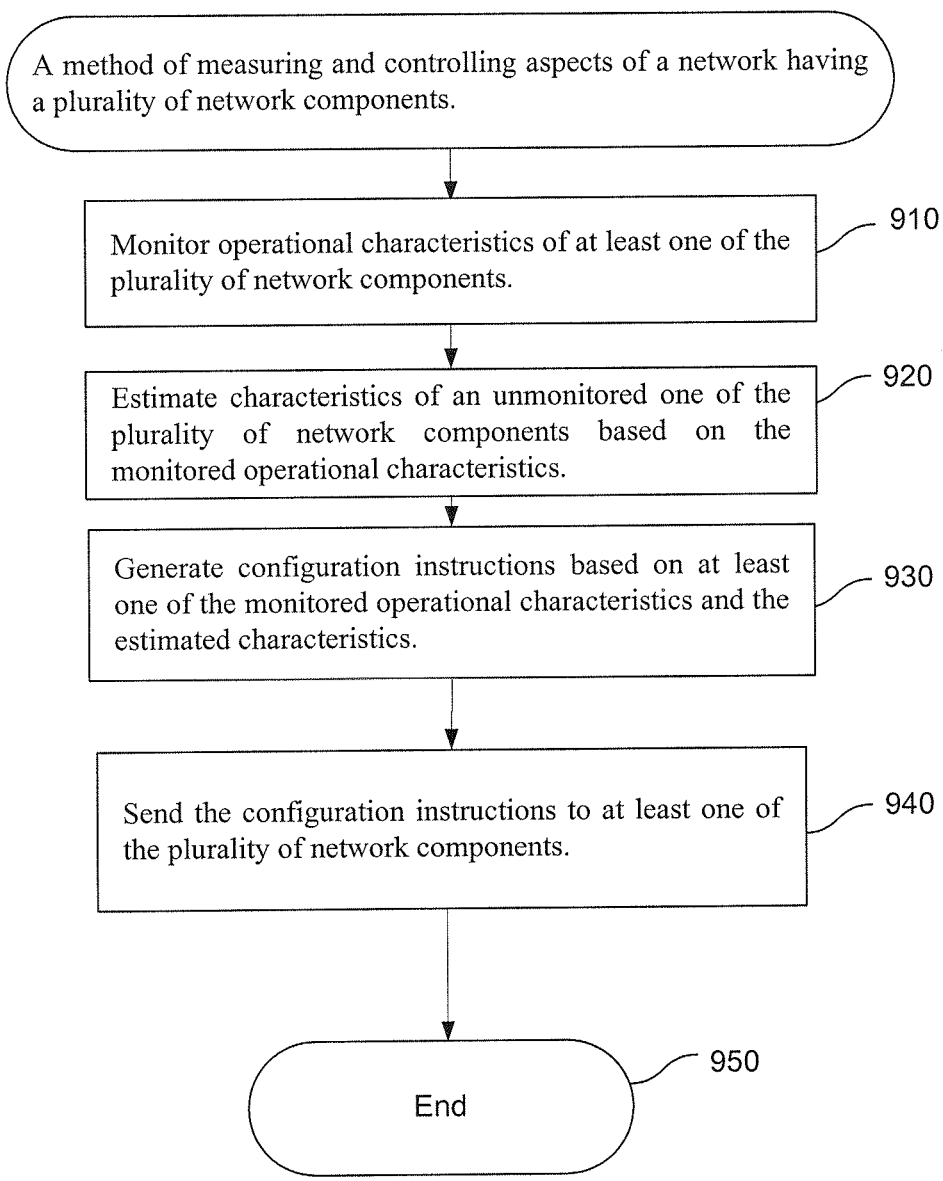
FIG. 9 shows a flowchart illustrating a method of measuring and controlling aspects of a network having a plurality of network components according to an embodiment of the invention.

This section and FIG. 9 summarize the techniques described herein by presenting a flowchart of an exemplary method 900 of a method of measuring and controlling aspects of a network having a plurality of network components. While method 900 is described with respect to an embodiment of the present invention, method 900 is not meant to be limiting and may be used in other applications.

As shown in FIG. 9, an embodiment of method 900 begins at step 910 where operational characteristics of at least one of the plurality of network components are monitored. In an embodiment depicted in FIG. 2, monitor 255 measures operational characteristics of host 150A in rack 280. Once step 910 is complete, method 900 proceeds to step 920.

At step 920, characteristics of an unmonitored one of the plurality of network components are estimated based on the monitored operational characteristics. In an embodiment depicted in FIG. 2, characteristics of unmonitored host 150E are estimated by analyzer 251 based on the operational characteristics collected by monitor 255 from host 150A. Once step 920 is complete, method 900 proceeds to step 930.

At step 930, configuration instructions are generated based on at least one of the monitored operational characteristics and the estimated characteristics. In an embodiment depicted on FIGS. 3 and 4, controller 350 generates configuration instructions for hosts 150E-H based on operational characteristics collected by monitor 255 and estimated characteristics determined by analyzer 251. Once step 930 is complete, method 900 proceeds to step 940.

At step 940, the generated configuration instructions are sent to at least one of the plurality of network components. In an embodiment depicted on FIGS. 3 and 4, controller 350 sends the configuration instructions generated for hosts 150E-H to hosts 150E-H, such configuration instructions being generated by controller 350.

Once step 940 is complete, method 900 ends.

The monitoring, analysis and controlling functions herein (e.g. monitor 255. analyzer 251, controller 350, etc.) can be implemented in hardware, software, or some combination thereof. For instance, controller 350 functions can be implemented using computer processors, computer logic, application specific circuits (ASIC), etc., as will be understood by those skilled in the arts based on the discussion given herein. Accordingly, any processor that performs the data collection, policy management, coordination and analysis functions described herein is within the scope and spirit of the present invention. For example, an embodiment of host 150A-L is a computer server using a processor to perform host functions.

Further, controller 350 functions described herein could be embodied by computer program instructions that are executed by a computer processor or any one of the hardware devices listed above. The computer program instructions cause the processor to perform controller 350 functions described herein. The computer program instructions (e.g. software) can be stored in a computer usable medium, computer program medium, or any computer-readable storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the data collection, policy management, coordination, analysis functions and other related functions described herein are within the scope and spirit of the present invention.

It should be appreciated that any component depicted on FIGS. 2-8 and referenced herein, can be implemented in the hardware and software techniques described above.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A system for measuring aspects of a network having a plurality of network components, comprising:
   a monitor, established for a particular customer of the network, configured to gather operational characteristics of a monitored one of the plurality of network components; and
   an analyzer configured to:
      analyze the gathered operational characteristics received from the monitor; and
      estimate an operational characteristic of an unmonitored one of the plurality of network components based on the gathered operational characteristics,
   wherein the gathered operational characteristics correspond to at least a power draw associated with one or more applications that are executing on the monitored one of the plurality of network components for the particular customer, and
   wherein the estimated operational characteristic corresponds to at least a power draw associated with the one or more applications that are executing on the unmonitored one of the plurality of network components for the particular customer.

2. The system of claim 1, wherein the analyzer is further configured to generate a map display of the estimated operational characteristic.

3. The system of claim 1, wherein the estimation of the operational characteristics of the unmonitored one of the plurality of network components is based on extrapolation from the gathered operational characteristics.

4. The system of claim 1, wherein the plurality of network components has an oversubscribed power configuration.

5. The system of claim 1, wherein the gathered operational characteristics include a measure of a frequency with which the monitored one of the plurality of network components is configured to utilize a low-power mode.

6. The system of claim 5, wherein the low-power mode is implemented using Energy Efficient Ethernet (EEE) mechanisms.

7. The system of claim 1, wherein the gathered operational characteristics include a measure of a frequency with which a link associated with the monitored one of the plurality of network components is configured to utilize a subrated mode.

8. The system of claim 1, further comprising a log, wherein the analyzer is further configured to:
   store the gathered operational characteristics in the log; and
   estimate the operational characteristics of the unmonitored one of the plurality of network components based on the gathered operational characteristics and information retrieved from the log.

9. The system of claim 1, further comprising a reference store, wherein the analyzer is further configured to:
   retrieve reference information about a reference network component from the reference store;
   store the retrieved reference information in a memory; and
   estimate the operational characteristics of the unmonitored one of the plurality of network components based on the gathered operational characteristics and the reference information stored in the memory.

10. The system of claim 9, wherein the reference information about the reference network component includes one of:
   physical characteristics of the reference network component,
   a power rating of the reference network component,
   a recommended temperature zone of the reference network component, and
   a recommended humidity zone of the reference network component.

11. The system of claim 1, further comprising a control policy associated with a first network component, wherein the analyzer is further configured to:
   retrieve the control policy associated with the first network component, and
   estimate the operational characteristics of the unmonitored one of the plurality of network components based on the gathered operational characteristics and the control policy.

12. The system of claim 11, wherein the first network component implements Energy Efficient Ethernet (EEE) mechanisms.

13. The system of claim 1, further comprising a topology reference associated with the plurality of network components, wherein the analyzer is further configured to:
   retrieve a topology of the network from the topology reference, such topology associated with a first one of the plurality of network components, and
   estimate the operational characteristics of the unmonitored one of the plurality of network components based on the gathered operational characteristics and the retrieved topology.

14. The system of claim 1, further comprising:
   a controller, wherein the controller is configured to:
      generate configuration instructions based on at least one of the gathered operational characteristics and the estimated operational characteristic, and
      send the configuration instructions to at least one of the plurality of network components.

15. The system of claim 14, wherein the configuration instructions are for a control policy modification and the at least one of the plurality of network components is a device that implements Energy Efficient Ethernet (EEE) mechanisms.

16. The system of claim 14, wherein the configuration instructions are designed to promote a goal with respect to the at least one of the plurality of network components.

17. The system of claim 16, wherein the goal is increased efficiency.

18. The system of claim 16, wherein the goal is increased performance.

19. The system of claim 14, further comprising:
   a threshold associated with a characteristic of a first one of the plurality of network components, wherein the controller is configured to generate responsive configuration instructions based on the characteristic when the characteristic exceeds the threshold.

20. The system of claim 19, wherein the responsive configuration instructions include disabling functions of the first one of the plurality of network components.

21. The system of claim 19, wherein the threshold is a power use threshold.

22. The system of claim 19, wherein the threshold is a power use threshold, the responsive configuration instructions including Energy Efficient Ethernet (EEE) control policies designed to reduce the power usage of the first one of the plurality of network components.

23. The system of claim 22, wherein the plurality of network components has an oversubscribed power configuration.

24. The system of claim 14, wherein the gathered operational characteristics, the estimated operational characteristic, and the generated configuration instructions relate to cooling a network component.

25. The system of claim 14, wherein the analyzer is further configured to generate a heat map display.

26. The system of claim 1, wherein at least one of the plurality of network components is one of a switch and a router.

27. The system of claim 1, wherein at least one of the plurality of network components is configured to be a host.

28. The system of claim 6, wherein the control policy modification is directed to energy efficiency settings associated with a port on a switch.

29. The system of claim 6, wherein the control policy modification is directed to increasing energy efficiency of a traffic path.

30. The system of claim 1, wherein the plurality of network devices is divided into two or more monitoring groups.

31. The system of claim 30, wherein each of the two or more monitoring groups is associated with a user.

32. A method of measuring aspects of a network having a plurality of network components, comprising:
   monitoring, using a monitor established for a particular customer of the network, operational characteristics of a monitored one of the plurality of network components; and
   estimating operational characteristics of an unmonitored one of the plurality of network components based on the monitored operational characteristics,
   wherein the monitored operational characteristics correspond to at least a power draw associated with one or more applications that are executing on the monitored one of the plurality of network components for the particular customer, and
   wherein the estimated operational characteristics correspond to at least a power draw associated with the one or more applications that are executing on the unmonitored one of the plurality of network components for the particular customer.

33. The method of claim 32, further comprising:
   generating configuration instructions based on at least one of the monitored operational characteristics and the estimated operational characteristics; and sending the configuration instructions to at least one of the plurality of network components.

34. The method of claim 32, further comprising:

retrieving reference information about a network component from a reference store, wherein the estimating comprises estimating operational characteristics of the unmonitored one of the plurality of network components based on the gathered operational characteristics and the reference information retrieved from the reference store.

35. The method of claim 32, further comprising:

storing the gathered operational characteristics in a log; and retrieving, from the log, log information about a first network component from among the plurality of network components, wherein the estimating comprises estimating operational characteristics of the unmonitored one of the plurality of network components based on the gathered operational characteristics and retrieved log information.

* * * * *